US012579044B2

(12) United States Patent
Al Mahmood et al.

(10) Patent No.: US 12,579,044 B2
(45) Date of Patent: Mar. 17, 2026

(54) DATA INGESTION REPLICATION AND DISASTER RECOVERY

(71) Applicant: Snowflake Inc., Bozeman, MT (US)

(72) Inventors: Abdullah Al Mahmood, Bothell, WA (US); Ruta Dhaneshwar, Redmond, WA (US); Xin Huang, Bellevue, WA (US); Ganeshan Ramachandran Iyer, Redmond, WA (US); Jiaxing Liang, Bellevue, WA (US); Nithin Mahesh, Kirkland, WA (US); Raghav Ramachandran, Seattle, WA (US); Purav B. Saraiya, Kirkland, WA (US); Yanyi Zhang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/810,853

(22) Filed: Aug. 21, 2024

(65) Prior Publication Data

US 2024/0411651 A1 Dec. 12, 2024

Related U.S. Application Data

(63) Continuation of application No. 18/158,586, filed on Jan. 24, 2023, now Pat. No. 12,093,152, which is a
(Continued)

(51) Int. Cl.
*G06F 7/00* (2006.01)
*G06F 11/14* (2006.01)
(Continued)

(52) U.S. Cl.
CPC ...... *G06F 11/2028* (2013.01); *G06F 11/1435* (2013.01); *G06F 16/27* (2019.01)

(58) Field of Classification Search
CPC ... G06F 11/2028; G06F 16/27; G06F 11/1435
(Continued)

(56) References Cited

U.S. PATENT DOCUMENTS 11,249,865 B1 2/2022 Agrawal et al.
11,586,515 B1 2/2023 Al Mahmood et al.
(Continued)

FOREIGN PATENT DOCUMENTS

CN 111656340 A 9/2020
CN 117093412 A 11/2023
DE 202023102700 U1 8/2023

OTHER PUBLICATIONS

"U.S. Appl. No. 17/663,941, Non Final Office Action mailed Jul. 18, 2022", 11 pgs.
(Continued)

*Primary Examiner* — Isaac M Woo
(74) *Attorney, Agent, or Firm* — Schwegman Lundberg & Woessner, P.A.

(57) ABSTRACT

Described herein are techniques for improving disaster recovery, in particular disaster recovery pertaining to data transfer requests. The data transfer request can be received by each of multiple deployments; however, only a primary deployment can process the request. The data transferred by the primary deployment may be replicated in the secondary deployments. In response to a failover event, one of the secondary deployments can be designated as the new primary development and continue the data transfer based on the data transfer request and the replication information received from the old primary deployment prior to the failover.

21 Claims, 11 Drawing Sheets

Related U.S. Application Data continuation of application No. 17/663,941, filed on May 18, 2022, now Pat. No. 11,586,515.

(51) Int. Cl.
*G06F 11/20* (2006.01)
*G06F 16/27* (2019.01)

(58) Field of Classification Search
USPC ...................................... 707/600–899; 714/2
See application file for complete search history.

(56) References Cited

U.S. PATENT DOCUMENTS

| | | | |
|---|---|---|---|
| 2005/0144254 A1* | 6/2005 | Kameda ................ | G06F 3/0635 709/217 |
| 2012/0324183 A1 | 12/2012 | Chiruvolu et al. | |
| 2015/0227600 A1 | 8/2015 | Ramu et al. | |
| 2016/0132576 A1 | 5/2016 | Qi et al. | |
| 2017/0331796 A1 | 11/2017 | Crofton et al. | |
| 2023/0376391 A1 | 11/2023 | Al Mahmood et al. | |

OTHER PUBLICATIONS

"U.S. Appl. No. 17/663,941, Notice of Allowance mailed Nov. 2, 2022", 10 pgs.

"U.S. Appl. No. 17/663,941, Response filed Oct. 18, 2022 to Non Final Office Action mailed Jul. 18, 2022", 9 pgs.

"U.S. Appl. No. 18/158,586, Non Final Office Action mailed Feb. 9, 2024", 18 pgs.

"U.S. Appl. No. 18/158,586, Notice of Allowance mailed May 29, 2024", 10 pgs.

"U.S. Appl. No. 18/158,586, Response filed May 9, 2024 to Non Final Office Action mailed Feb. 9, 2024", 12 pgs.

"European Application Serial No. 23173953.3, Extended European Search Report mailed Sep. 22, 2023", 7 pgs.

"European Application Serial No. 23173953.3, Response filed May 21, 2024 to Extended European Search Report mailed Sep. 22, 2023", 11 pgs.

"Chinese Application Serial No. 202310564679.6, Office Action mailed Nov. 1, 2024", with English translation, 22 pages.

* cited by examiner

| | In Primary Pending Slice | Ingested in Primary Table | Replicated in Secondary Table | Ingested in Secondary Table |
|---|---|---|---|---|
| F1 | X | X | X | |
| F2 | X | X | | O |
| F3 | X | | | O |
| Failover | | | | |
| F4 | | | | O |
| Failback | | | | |

DATA INGESTION REPLICATION AND DISASTER RECOVERY

CROSS-REFERENCE TO RELATED APPLICATIONS

This application is a Continuation of U.S. patent application Ser. No. 18/158,586, filed Jan. 24, 2023, which is a Continuation of U.S. patent application Ser. No. 17/663,941, filed May 18, 2022 and now issued as U.S. Pat. No. 11,586,515, the contents of which are hereby incorporated by reference in their entireties.

TECHNICAL FIELD

The present disclosure generally relates to data systems, such as data warehouses, and, more specifically, to data replication and disaster recovery.

BACKGROUND

Data systems, such as database systems, may be provided through a cloud platform, which allows organizations and users to store, manage, and retrieve data from the cloud. A variety of techniques can be employed for uploading and storing data in a database or table in a cloud platform. Those techniques are typically limited to situations where a source and a target table are provided in the same cloud provider.

Moreover, uploading techniques can be susceptible to system failures and disaster recovery. For example, if a system experiences a failure while data is being uploaded, some or all of that data can be lost.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for improving disaster recovery, in particular disaster recovery pertaining to data transfer requests. The data transfer requests can include auto-ingestion requests or batch style requests, such as "copy" commands. For auto-ingestion, multiple deployments may be pre-configured to perform the auto-ingestion with one deployment being designated as a primary deployment and others being designated as secondary deployments. The data transfer request can be received by each of the multiple deployments; however, only the primary deployment can process the request. The data transferred by the primary deployment may be replicated in the secondary deployments. In response to a failover event, one of the secondary deployments can be designated as the new primary development and continue the data transfer based on the data transfer request and the replication information received from the old primary deployment prior to the failover. Therefore, the user experience is significantly improved because even when a system error occurs at the primary deployment, the data transfer can be completed seamlessly by the secondary deployment.

Figure 1:
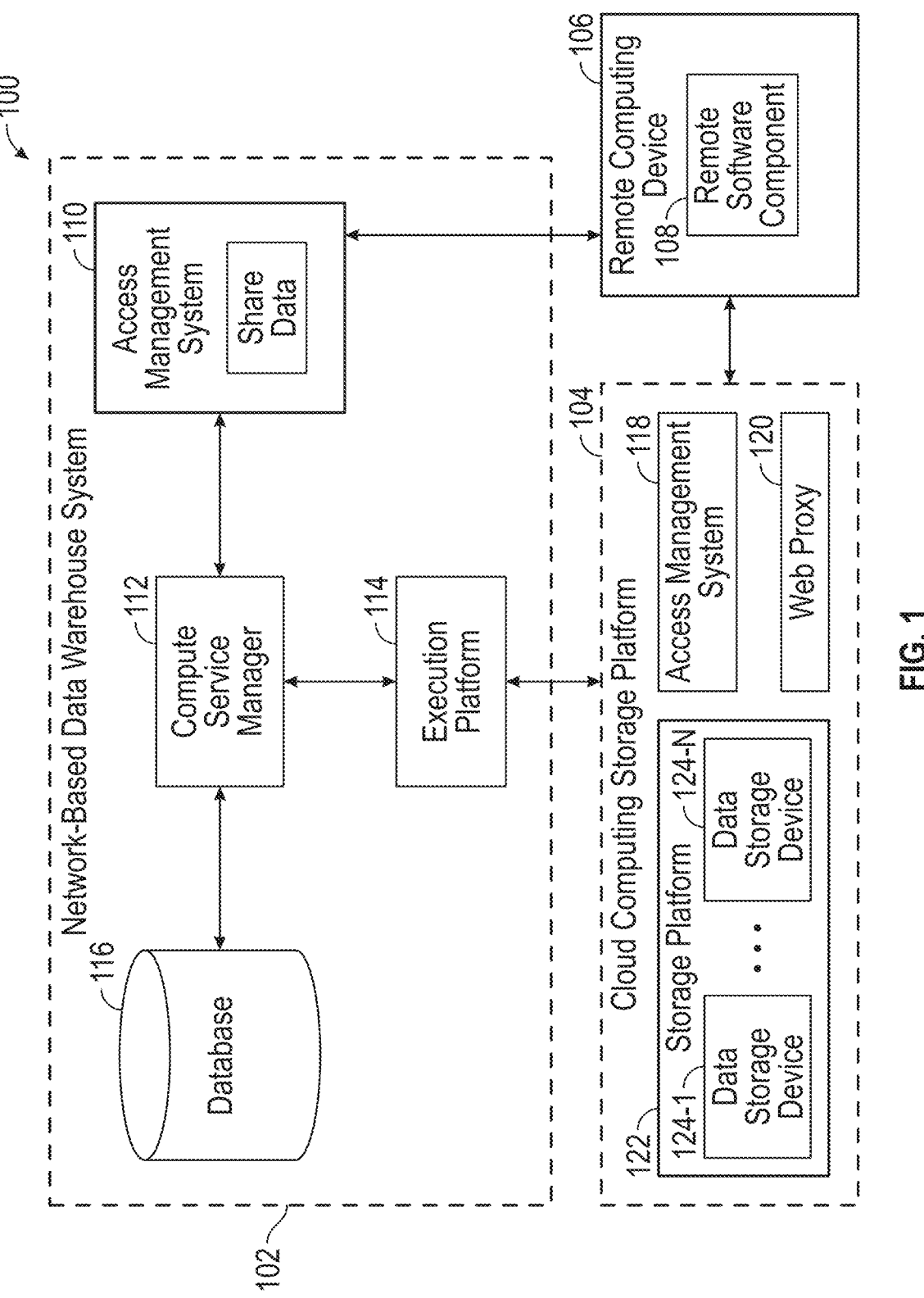
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/ devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
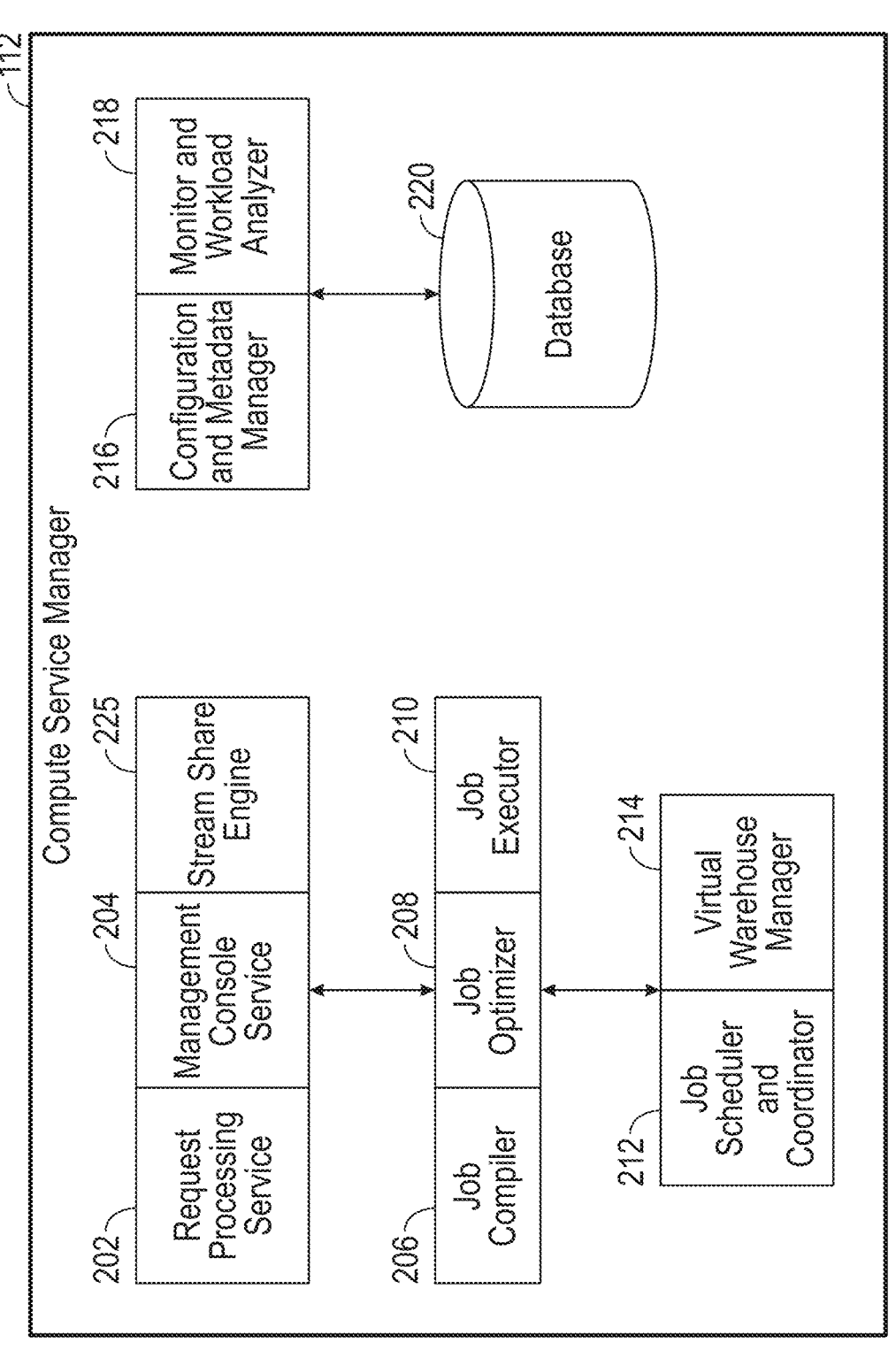
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
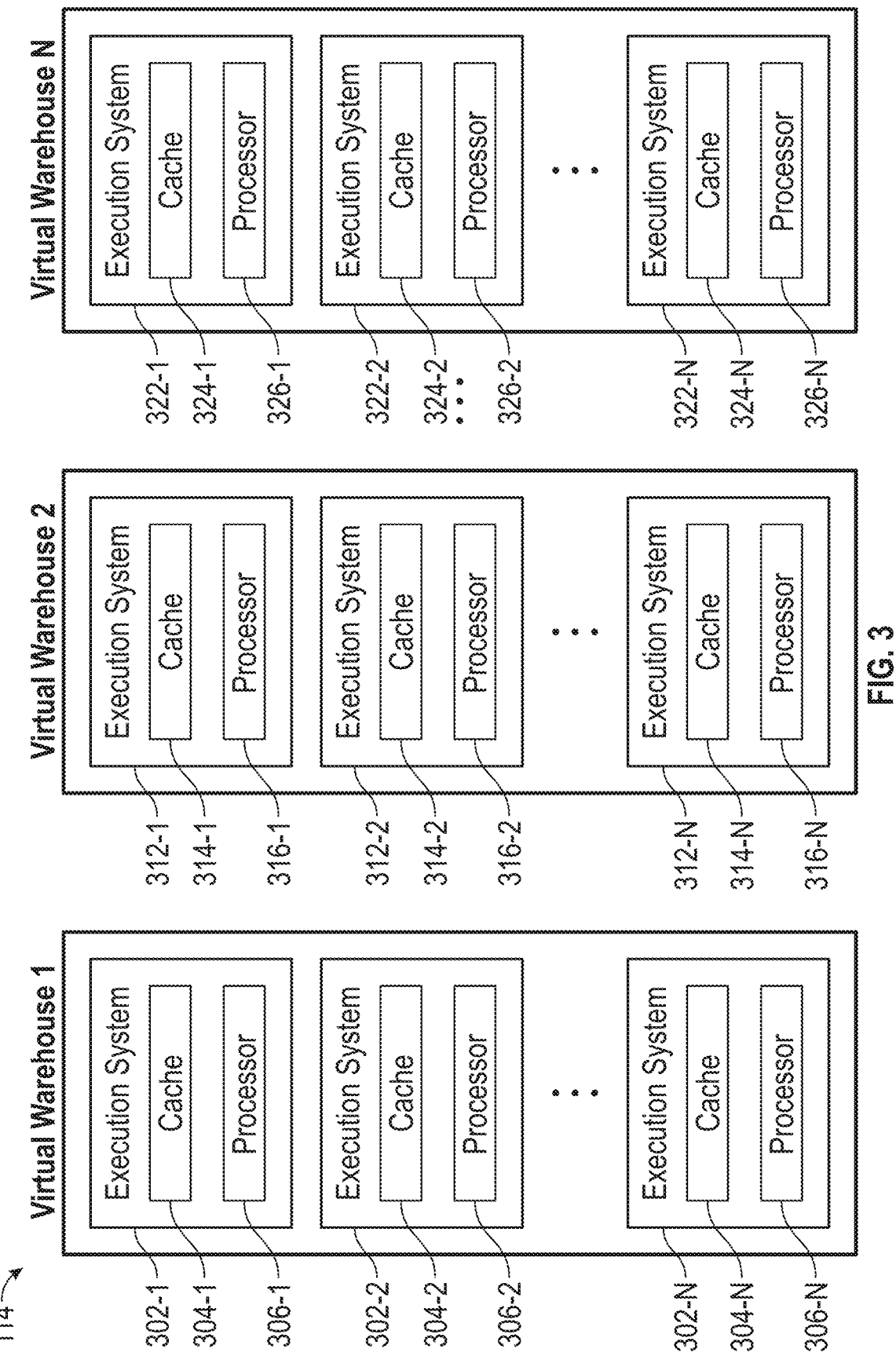
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As mentioned above, data from a client storage can be uploaded to the data warehouse. Some techniques can use a "copy" command for this transfer. The "copy" command is typically manually performed or performed based on a set schedule (say, every 15 minutes). However, the use of such "copy" commands can add latency.

Figure 4:
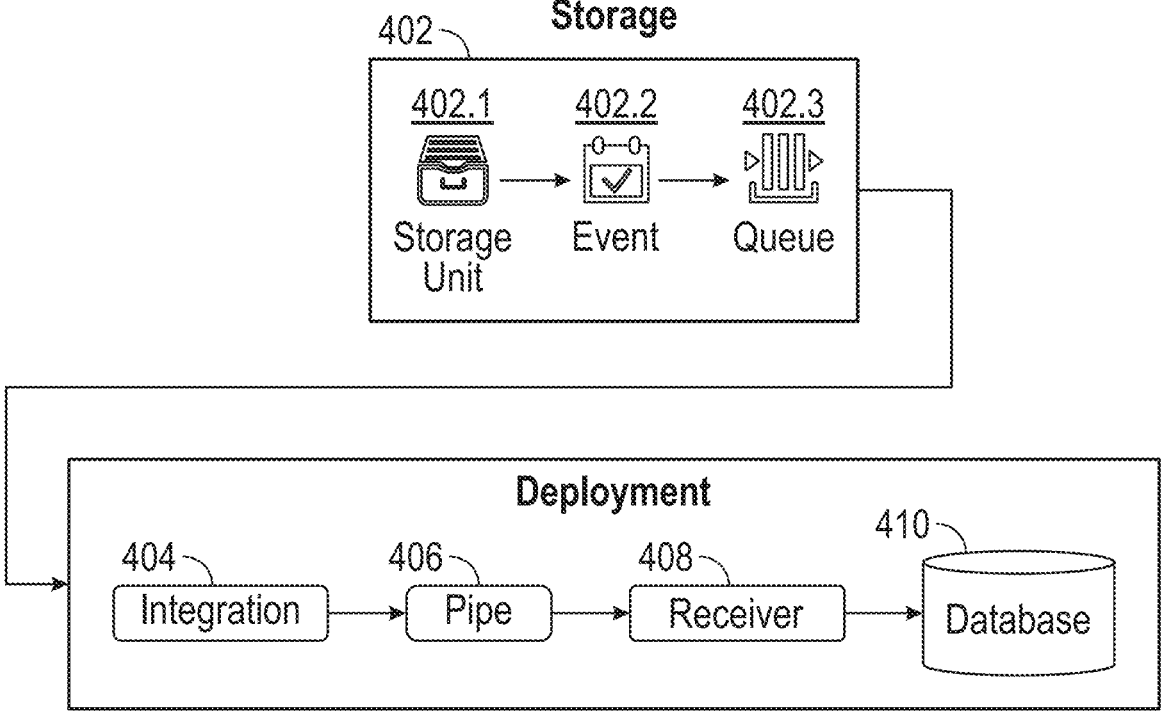
FIG. 4 is a simplified block diagram of a system for automated data ingestion, according to some example embodiments.

Consequently, latency can be improved by implementing auto-ingestion techniques, as described in further detail below. FIG. 4 is a simplified block diagram of system 400 for automated data ingestion, according to some example embodiments. The system may include a storage 402, which may be provided as cloud storage (e.g., Amazon S3 storage, Azure storage, GCP storage, etc.). The storage 402 may include client data to upload to the data warehouse.

The storage 402 may store data (or files) to be ingested into a database 410. In some embodiments, the storage 402 may include a storage unit 402.1, an event block 402.2, and a queue 402.3. The system may also include a deployment to ingest data in the database 410. A deployment may include multiple components such as a metadata store/DB, a front-end layer, a load balancing layer, a data warehouse, etc., as discussed above with respect to FIGS. 1-3. The deployments may be provided as public or private deployments. A public deployment may be implemented as a multi-tenant environment, where each tenant or account shares processing and/or storage resources. For example, in a public deployment, multiple accounts may share a metadata store, a front-end layer, a load balancing layer, a data warehouse, etc. A private deployment, on the other hand, may be implemented as a dedicated, isolated environment, where processing and/or storage resources may be dedicated.

The deployment may be communicatively coupled to the queue 402.3, and may include an integration 404, a pipe 406, and a receiver 408. Integration 404 may be configured to receive a notification when new data becomes available in queue 402.3. For example, the queue may include a pool of Simple Queue Service™ (SQS) queues as part of an Amazon Web Services™ S3 bucket. The pool of SQS queues may be provided to client accounts to add user files to a bucket. A notification may be automatically generated when one or more user files are added to a client account data bucket. A plurality of customer data buckets may be provided for each client account. The automatically generated notification may be received by the integration 404.

For example, the integration 404 may provide information relating to an occurrence of an event in the queue 402.3. Events may include creation of new data, update of old data, and deletion of old data. The integration 404 may also provide identification information for a resource associated with the event, e.g., the user file that has been created, updated, or deleted. The integration 404 may communicate with the queue 402.3 because the integration 404 may be provided with credentials for the queue 402.3, for example by an administrator and/or user. In an embodiment, the integration 404 may poll the queue 402.3 for notifications.

The integration 404 may deliver the notification to the pipe 406, which may be provided as a single pipe or multiple pipes. The pipe 406 may store information relating to what data and the location of the data for automatic data ingestion related to the queue 402.3.

The receiver 408 may perform the automated data ingestion, and then store the ingested data in the database 410. Data ingestion may be performed using the techniques described in U.S. patent application Ser. No. 16/201,854, entitled "Batch Data Ingestion in Database Systems," filed on Nov. 27, 2018, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

Figure 5:
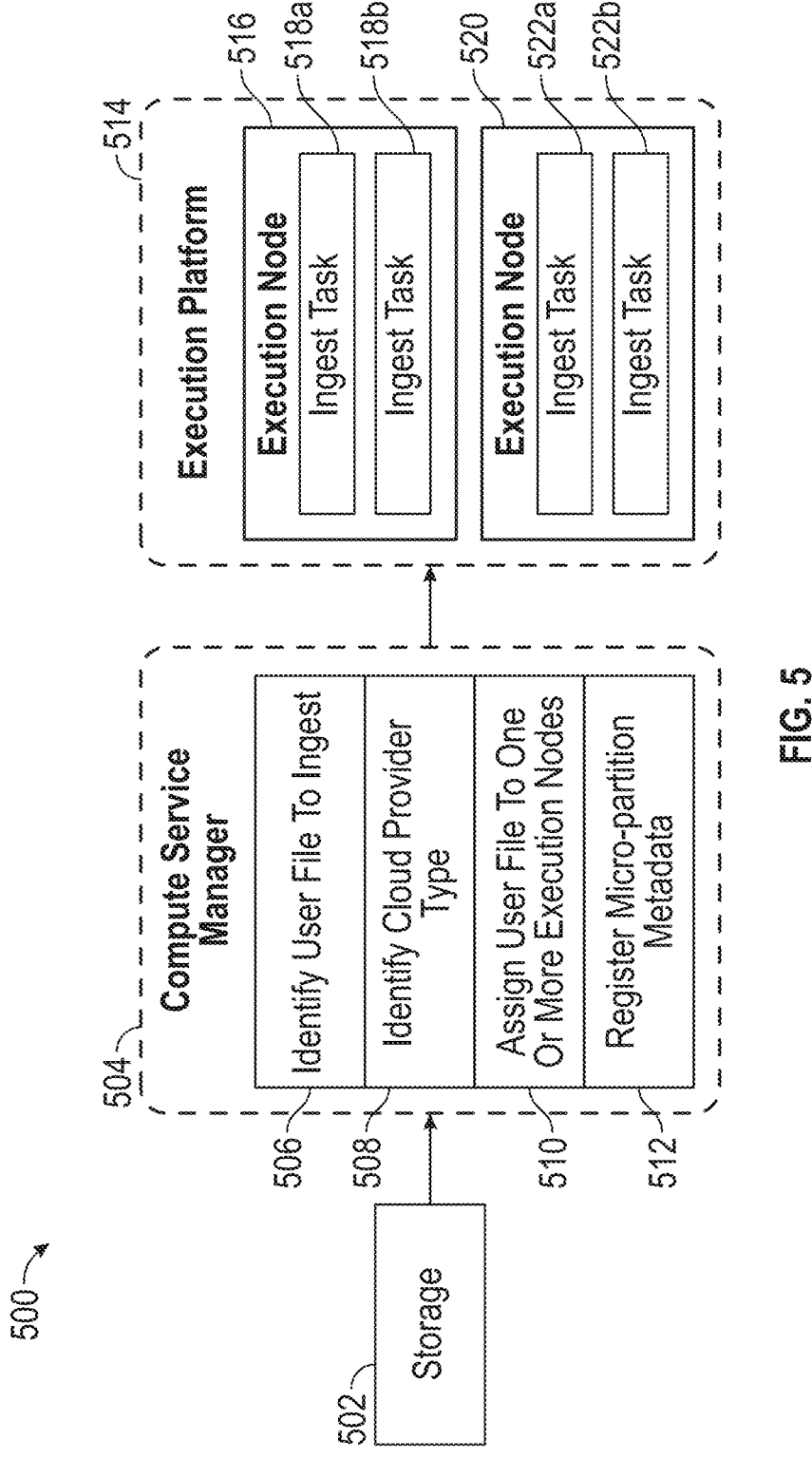
FIG. 5 is a schematic block diagram of a process 500 of ingesting data into a database, according to some example embodiments.

FIG. 5 is a schematic block diagram of a process 500 of ingesting data into a database, according to some example embodiments. The process 500 begins and a storage 502 sends an ingest request, such as a notification. The storage 502 may directly or indirectly communicate with the database system to send in the ingest request. In some embodiments, the ingest request is a notification provided by a third-party vendor storage account, or the ingest request may arise from a compute service manager polling a data lake associated with the client account to determine whether any user files have been added to the client account that have not yet been ingested into the database. The notification includes a list of files to insert into a table of the database. The files are persisted in a queue specific to the receiving table of the database.

The ingest request is received by a compute service manager 504. The compute service manager 504 identifies at step 506 a user file to ingest. At step 505, the compute service manager identifies a cloud provider type associated with the client account. At step 510, the compute service manager 504 may assign the user file to one or more execution nodes, based at least in part on the detected cloud provider type, and registers at step 512 micro-partition metadata associated with a database table after the file is ingested into a micro-partition of the database table. The compute service manager 504 provisions one or more execution nodes 516, 520 of an execution platform 514 to perform one or more tasks associated with ingesting the user file. Such ingest tasks 518a, 518b, 522a, 522b include, for example, cutting a file into one or more sections, generating a new micro-partition based on the user file, and/or inserting the new micro-partition in a table of the database.

The process 500 begins an ingest task that is executed by a warehouse. The ingest task may pull user files from the queue for a database table until it is told to stop doing so. The ingest task may periodically cut a new user file and add it to the database table. In one embodiment, the ingest process is "serverless" in that it is an integrated service provided by the database or compute service manager 504. That is, a user associated with the client account need not provision its own warehouse or a third-party warehouse in order to perform the ingestion process. For example, the database or database provided (e.g., via instances of the compute service manager 504) may maintain the ingest warehouse that then services one or more or all accounts/customers of the database provider.

In some embodiments, there may be more than one ingest task pulling from a queue for a given table, and this might be necessary to keep up with the rate of incoming data. In some embodiments, the ingest task may decide the time to cut a new file to increase the chances of getting an ideal sized file and avoid "odd sized" files that would result if the file size was lined up with one or more user files. This may come at the cost of added complexity as the track line number of the files consumed must be tracked.

As mentioned above, data transfer techniques such as using the "copy" command or auto-ingestion can be susceptible to data loss due to system failures. For example, back-up databases (e.g., replicated databases) may be set up; however, system failures during data transfer may still result in data loss or result in having to ingest data multiple times. Next, techniques for replicating databases that are resilient to system errors during data transfer are described.

Figure 6:
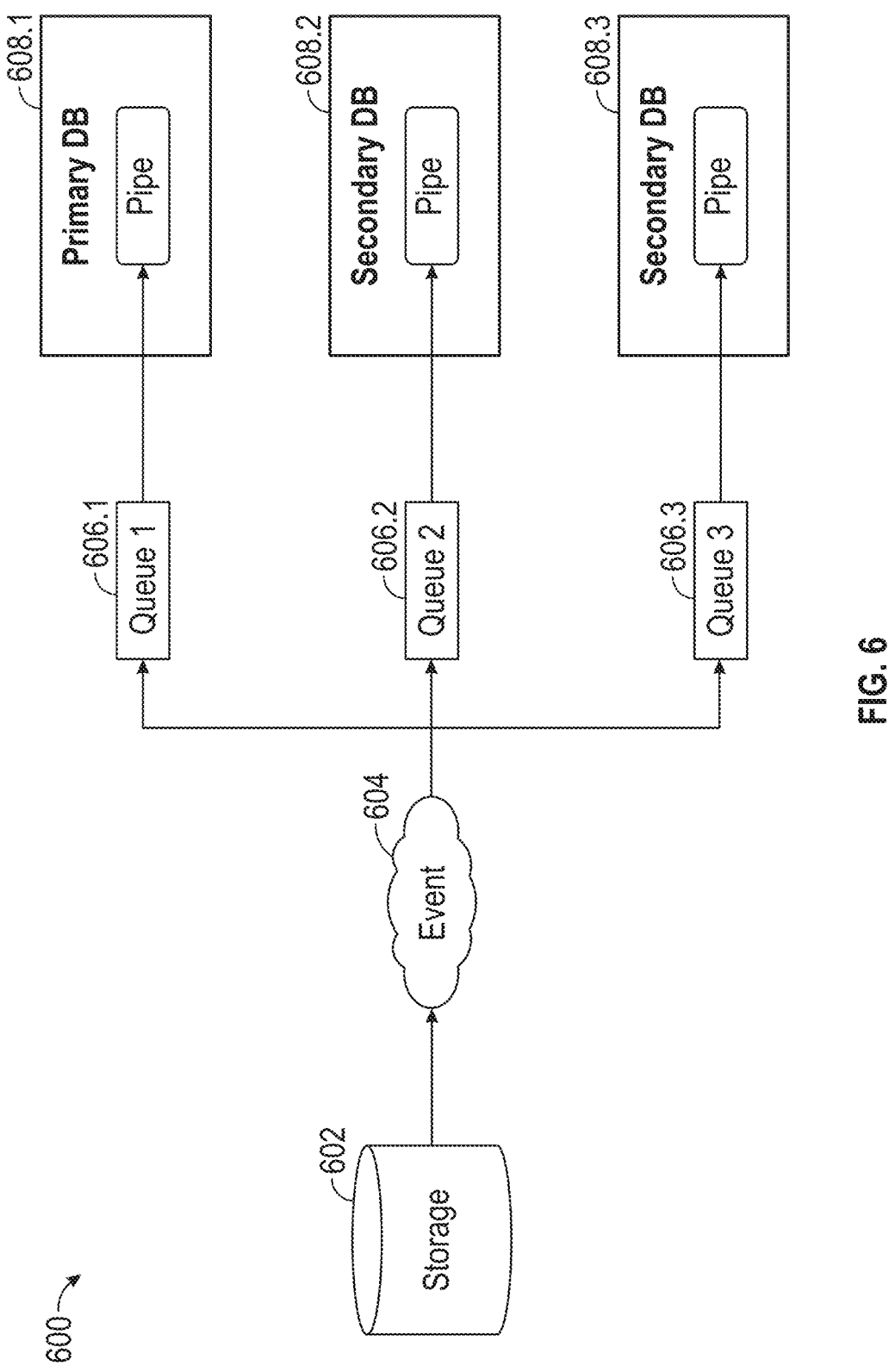
FIG. 6 is a simplified block diagram of a system for automated data ingestion with replication, according to some example embodiments.

FIG. 6 is a simplified block diagram of system 600 for automated data ingestion with replication, according to some example embodiments. The system 600 may include storage 602, which may be provided as cloud storage (e.g., Amazon S3 storage, Azure storage, GCP storage, etc.). The storage 602 may include client data to upload to the data warehouse. The storage 602 may be similar to the storage 402 described above with reference to FIG. 4.

The system 600 may also include an event block 604 and a plurality of queues 606.1, 606.2, 606.3. Each queue 606.1, 606.2, 606.3 may correspond to a different database deployment 608.1, 608.2, 608.3. For example, queue 606.1 may be communicatively coupled to deployment 608.1, which is designated as a primary deployment/database; queue 606.2 may be communicatively coupled to deployment 608.2, which is designated as a secondary deployment; and queue 606.3 may be communicatively coupled to deployment 608.3, which is designated as a secondary deployment. In some embodiments, a single queue may be used and communicatively coupled to the plurality of deployments 608.1-608.3.

At one time, one deployment may be designated as a primary while others may be designated as secondary deployments. The designation may be controlled by an administrator. For example, a command may be used to change the primary designation, such as "ALTER DATABASE target PRIMARY." In some embodiments, the designation may be automated based on set of rules and conditions. The rules and conditions may include customer choice, latency, last refresh time, geographic location, etc. The deployment, and in particular the pipe structure within the deployment, may be set in read-only mode with respect to ingest requests when designated as a secondary, and may be set in write mode when designated as the primary.

In some embodiments, the deployments 608.1, 608.2, 608.3 may be located in different geographical locations. For example, deployment 608.1 may be located in Northeast United States, deployment 608.2 may be located in Northwest United States, and deployment 608.3 may be located in South United States. In some embodiments, the deployments 608.1, 608.2, 608.3 may be provided by different cloud service providers.

Each deployment may include an integration, a pipe, and a receiver, as described above, configured to perform auto-ingestion. However, only the deployment designated as the primary (in this example, deployment 608.1) will perform the auto-ingestion based on the notification from storage 602 and event block 604. While the other deployments designated as secondary deployments will receive the event notifications (also referred to as ingest requests), they will not perform the auto-ingestion unless their designation is switched to primary.

As explained in further detail below, one of the secondary deployments may take over auto-ingestion in case of a system error at the primary deployment and a failover occurs. Since the secondary deployments have been preconfigured to receive the auto-ingestion requests (e.g., notifications), will have pre-configured auto-ingestion structures such as integrations, pipes, receives, etc., one of the secondary deployments can seamlessly take over auto-ingestion in the case of a failover.

To further facilitate switching primary deployments, the table at the primary deployment may be replicated at the secondary deployments using, for example, using a refresh command (e.g., "ALTER DATABASE REFRESH"). The refresh command may be automatically executed periodically at set times (e.g., every 1 minute, 5 minutes, 1 hour, etc.). In some embodiments, expression property (EP) files from the primary deployment may be copied and stored at the secondary deployment(s). EP files may include information regarding the table version and table data used for table replication. Expression properties of a table may include two types of files: delta EP files and compacted EP files. Delta EP files may track changes between table versions. Compacted EP files may be periodically generated when multiple delta EP files are combined and may represent one point in time.

Figure 7:
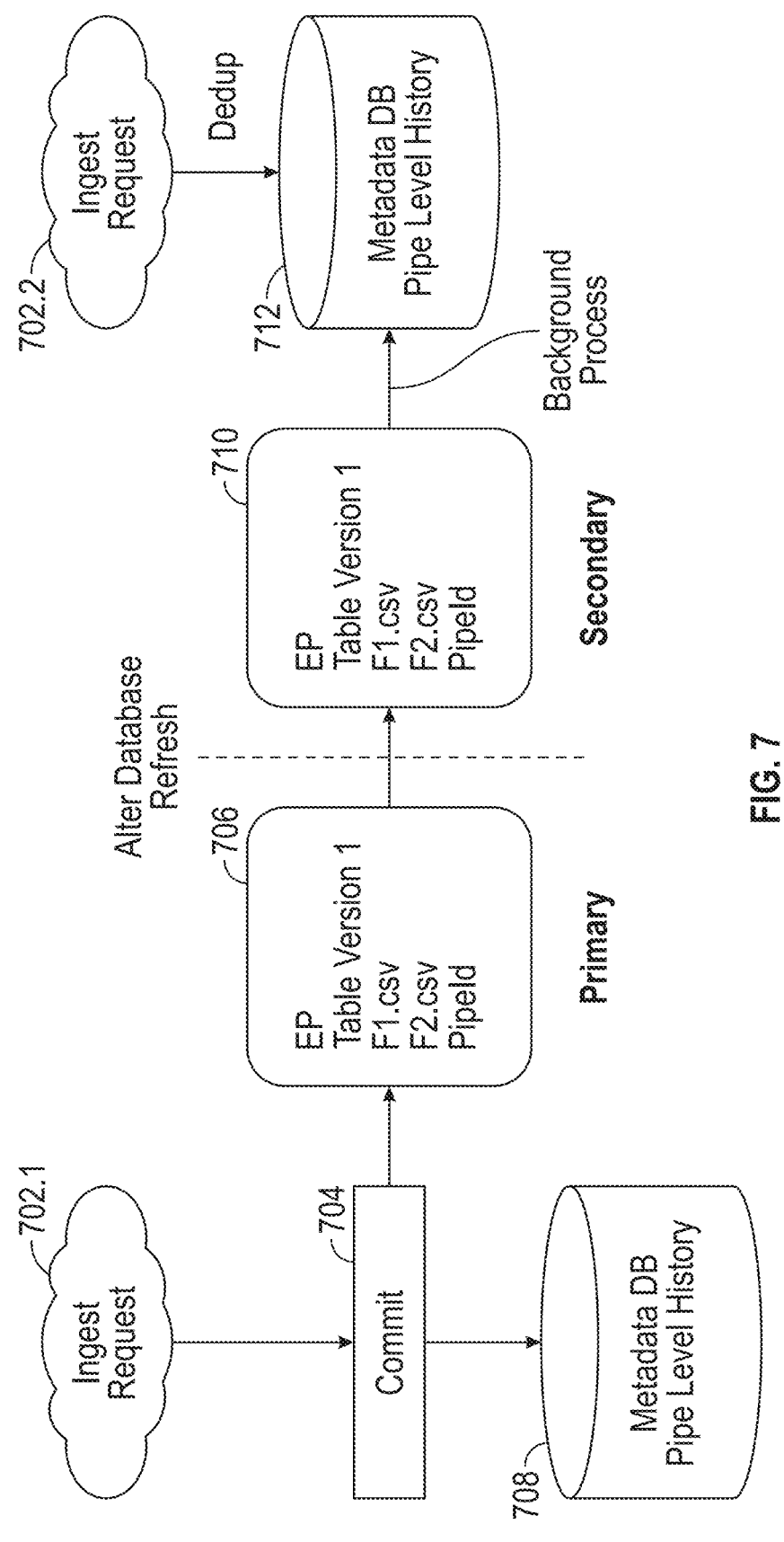
FIG. 7 illustrates a process for replicating a table using auto-ingestion, according to some example embodiments.

FIG. 7 illustrates a process 700 for replicating a table using auto-ingestion, according to some example embodiments. For example, the process 700 may be executed by compute service managers (as described above with reference to compute service manager 112) in respective primary and secondary deployments.

At block 702.1, a primary deployment may receive an ingest request. The ingest request may be provided as an event notification, as described above. At block 702.2, a secondary deployment may also receive the ingest request. Although the secondary deployment may not process the ingest request, the secondary deployment may send an acknowledge message confirming receipt of the ingest request. The ingest request may include a list of files to be ingested into the primary deployment.

At block 704, the primary deployment may ingest the files in the ingest request and commit those files to the table. At block 706, the primary deployment may create a corresponding EP file for the files ingested. For example, the EP file may include information such as the table version (e.g., "Table Version 1"), the file names of the files ingested (e.g., "F1.csv" and "F2.csv"), and a pipe identification of the pipe used for the ingestion (e.g., "PipeID"). At block 708, the primary deployment may write the EP files in its metadata database storing ingest history (e.g., pipe level history).

The ingest history may be stored as a data persistent object (DPO). The DPO may include a plurality of slices. For example, one slice may indicate completely ingested. This completely ingested slice may also include EP history, e.g., delta and history EP files. For example, one slice may indicate partially ingested files. This slice may include EP histories of files that are presently being ingested. Also, this slice may include offset information to resume auto-ingestion. A refresh command may be executed (e.g., "ALTER DATABASE REFRESH"). The refresh command may be automatically executed periodically at set times (e.g., every 1 minute, 5 minutes, 1 hour, etc.). In response to the refresh command, at block 710, the EP file from the primary deployment may be copied and transmitted to the secondary deployment(s).

At block 712, a background process in the secondary deployment may write the EP file into a metadata database in the secondary deployment storing ingest history for the replicated table (e.g., pipe level history). The metadata DB may also receive the ingest requests (block 702.2); therefore, the metadata DB may dedupe already processed ingest requests based on the ingested file names in the EP file. Thus, the secondary deployment may store relevant information needed to seamlessly take over auto-ingestion in case of a failover. Moreover, having the ingest history data stored in the metadata DB can improve latency because this information can be quickly retrieved and processed.

Figures 8, 9:
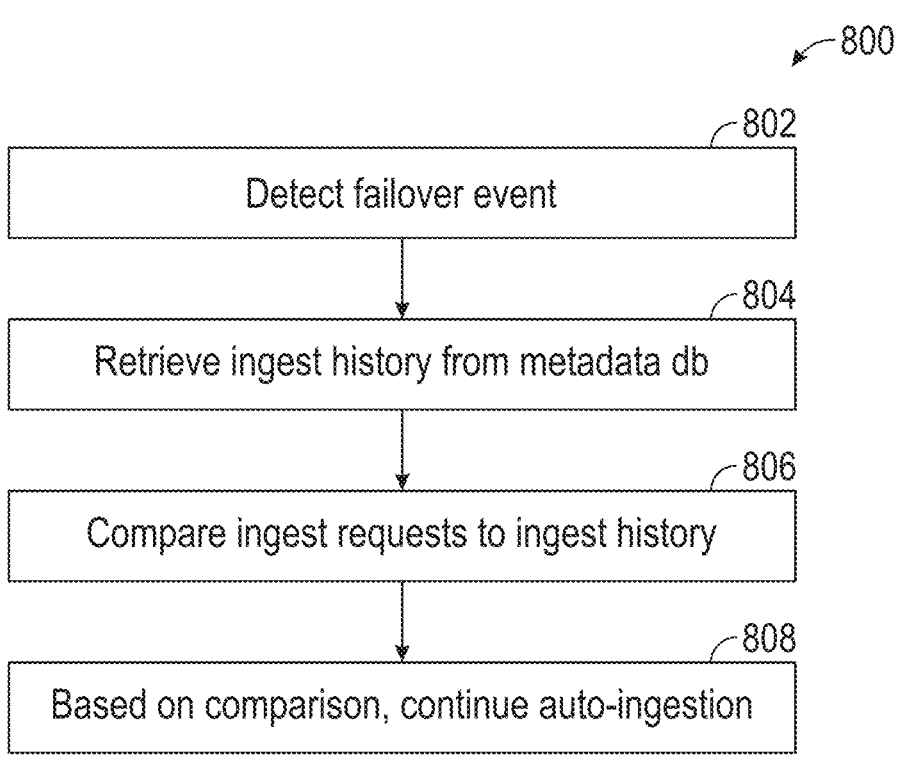
FIG. 8 shows a flow diagram of a method for data replication at a failover, according to some example embodiments.
FIG. 9 illustrates a scenario depicting continuation of auto-ingestion responsive to a failover event, according to some example embodiments.

FIG. 8 shows a flow diagram of a method 800 for data replication at a failover, according to some example embodiments. For example, method 800 may be executed by a compute service manager in a secondary deployment. At operation 802, a failover event may be detected. For example, a system error may occur at a primary deployment and a failover command to switch primary deployments may be executed (e.g., "ALTER DATABASE target PRIMARY"), switching the primary designation to the designated secondary deployment. In some embodiments, detection and execution of the failover may be performed manually by an administrator. In some embodiments, detection and execution of the failover may be performed automatically based on detection conditions. For example, a system error may be detected based on DNS records, time between receiving files, lack of new events for a defined time, etc. If one or more of these conditions are detected, a failover command may be executed automatically switching primary deployments.

At operation 804, in response to the failover event, the newly designated primary deployment (previously designated secondary deployment) may retrieve the ingest history from its metadata DB. The ingest history may include information from the latest EP files received from the previous primary deployment as part of refresh operations. The EP file information may include filenames of files ingested and replicated in the newly designated deployment.

At operation 806, the newly designated primary deployment may compare the ingest requests and the ingest history retrieved from its metadata DB. Because the ingest history is retrieved from the metadata DB, the retrieval can be performed quickly, reducing latency. As mentioned above, the ingest history may be stored as a DPO with a plurality of slices. For example, one slice may indicate completely ingested. Information in this completed-ingested slice may be used to determine which files in the pending ingest requests have been completed. The DPO may also include one slice indicating partially ingested files. This slice may include EP histories of files that are presently being ingested. Also, this slice may include offset information to resume auto-ingestion.

At operation 808, based on the comparison of the ingest requests and EP file information, the newly designated primary deployment may continue the auto-ingestion of customer files. The newly designated primary deployment may ingest files in the ingest requests but not found in the ingest history retrieved from its metadata DB. For example, the information in the partially ingested slice of the ingest history DPO may be used to determine where the auto-ingestion should be started, for example, using the offset information. For the customer, this transition of deployments to perform the auto-ingestion may appear seamless.

FIG. 9 illustrates a scenario depicting continuation of auto-ingestion responsive to a failover event, according to some example embodiments. Here, consider a first ingest request includes files f1, f2, and f3 to be ingested into a table. The primary deployment may place these files into its primary pending slice and start the ingestion process, as described herein. The primary deployment may ingest file f1 (e.g., committing it to the table), and may also write an EP file indicating its ingestion. This EP file may be copied and transmitted to a secondary deployment for replication in response to a refresh command.

The primary deployment may also ingest file f2 (e.g., committing it to the table). However, before it's EP file indicating its ingestion can be copied and replicated in the secondary deployment (e.g., next refresh command), a failover may occur, switching the primary designation to a secondary deployment.

As described above, the secondary deployment also received the first ingest request including file names f1, f2, and f3. The secondary deployment may compare the stored ingest history to the ingest request. The comparison may indicate that f1 from the ingest request is stored in the secondary deployment based on the past replication, but files f2 and f3 are not. Thus, the secondary deployment may then continue the auto-ingestion of files f2 and f3.

Moreover, a second ingest request may be received after the failover. The second ingest request includes file f4 to be ingested into a table. The secondary deployment may then ingest file f4 since it is now acting as the primary deployment.

In this example, the system error that caused the failover may have been resolved, and a failback may be performed. That is, the primary designation may be set back to the original primary deployment. In this example, f2, f3, and f4 will not need to be re-ingested by the original primary deployment after the failback. File f2 will be deduped because f2 was previously ingested by the original primary deployment before the failover.

Figure 10:
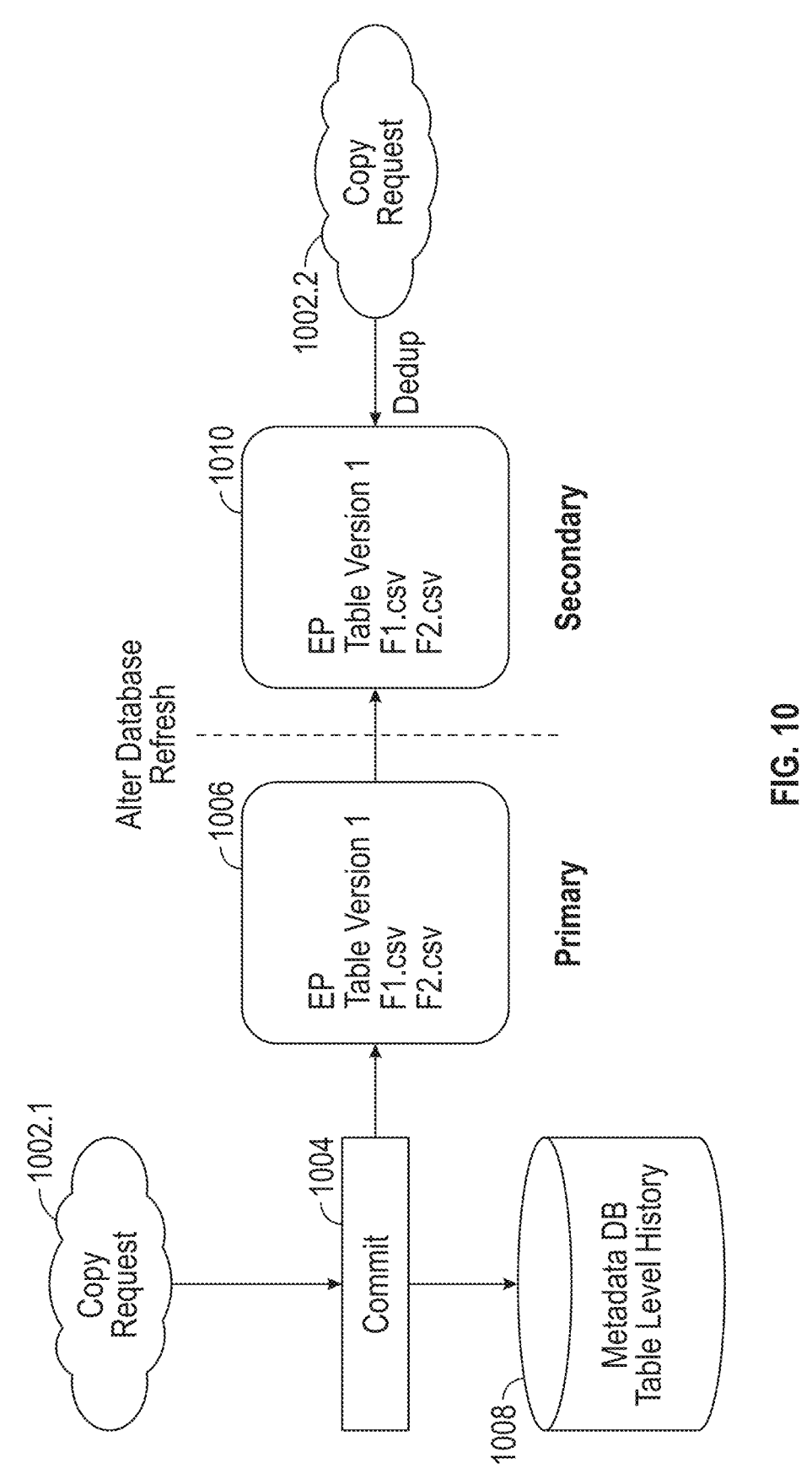
FIG. 10 illustrates a process for replicating a table using batch style data transferring techniques, according to some example embodiments.

The replication techniques described herein can be used for continuous data transfer methods such as auto-ingestion as well as for batch style methods such as using "copy" commands. FIG. 10 illustrates a process 1000 for replicating a table using batch style data transferring techniques, according to some example embodiments. For example, the process 1000 may be executed by compute service managers (as described above with reference to compute service manager 112) in respective primary and secondary deployments.

At block 1002.1, a primary deployment may receive a data transfer request, such as a "copy" request. At block 1002.2, a secondary deployment may also receive the "copy" request. Although the secondary deployment may not process the "copy" request, the secondary deployment may send an acknowledge message confirming receipt of the "copy" request. The "copy" request may include a list of files to be transferred into the primary deployment.

At block 1004, the primary deployment may copy the files in the "copy" request and commit those files to the table. At block 1006, the primary deployment may create a corresponding EP file for the files copied. For example, the EP file may include information such as the table version (e.g., "Table Version 1") and the file names of the files copied (e.g., "F1.csv" and "F2.csv"). At block 1008, the primary deployment may write the EP files in its metadata database storing table level history.

A refresh command may be executed (e.g., "ALTER DATABASE REFRESH"). The refresh command may be automatically executed periodically at set times (e.g., every 1 minute, 5 minutes, 1 hour, etc.). In response to the refresh command, at block 1010, the EP file from the primary deployment may be copied and transmitted to the secondary deployment(s).

As mentioned above, the secondary deployment may also receive the "copy" requests (block 1002.2); therefore, the secondary deployment may dedupe already processed "copy" requests based on the copied file names in the EP file. Additionally, a bloom filter may be used to reduce latency. A bloom filter can increase effective cache size for the EP files. For example, a cache may be kept in the secondary deployment for storing the EP files received from the primary. Before downloading the EP files from storage, a bloom filter may be applied to reduce the number of EP files to scan from the storage.

In the descriptions above, redundancy has been added to the deployments in case of system errors in the deployments. However, system errors can also occur on the storage side from which a user is uploading data. Therefore, redundancy can also be added to the storage side where a user can utilize a back-up storage (i.e., secondary storage) in case there is a system error in a primary storage.

Figure 11:
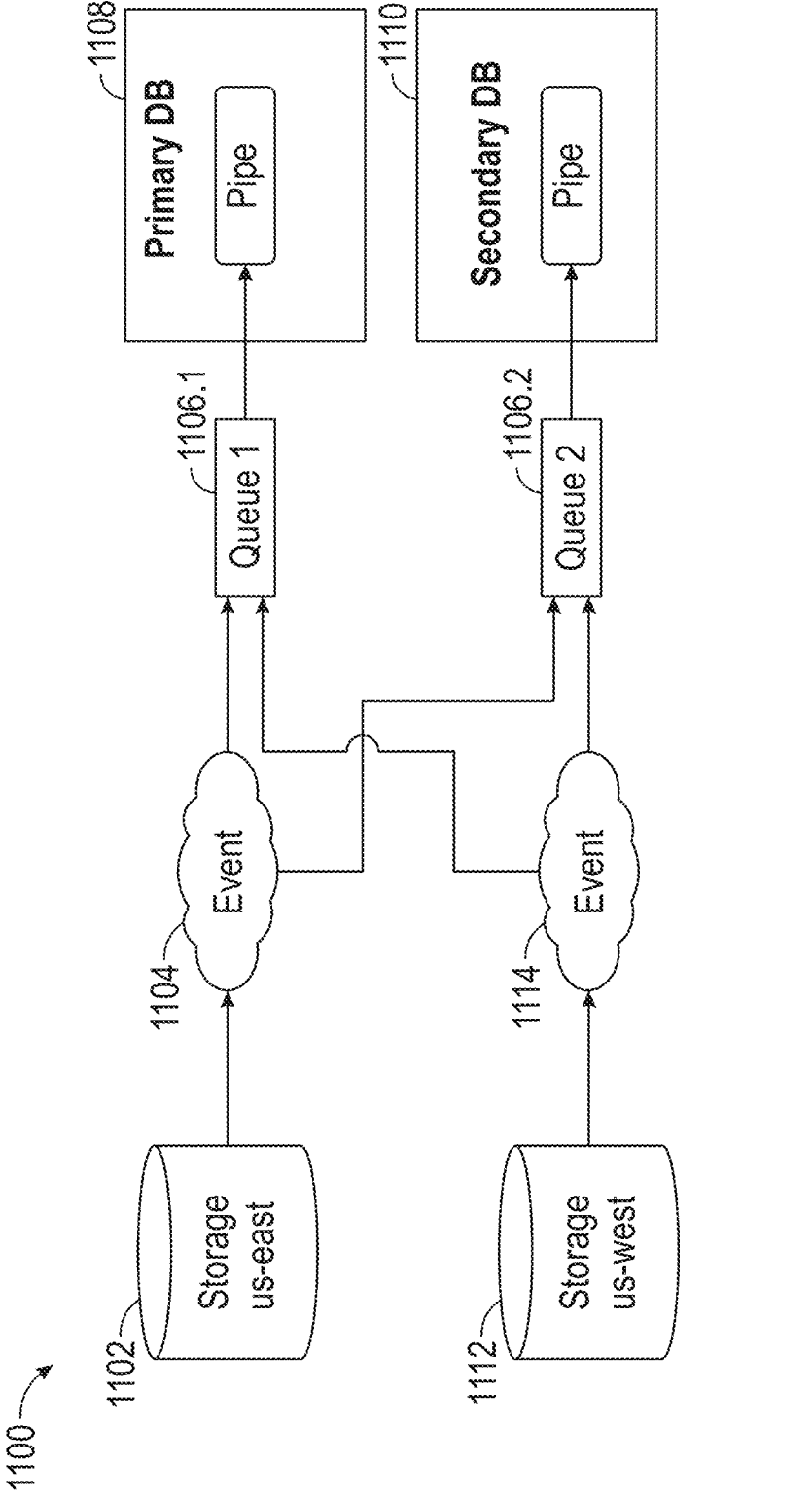
FIG. 11 is a simplified block diagram of a system for automated data ingestion with replication, according to some example embodiments.

FIG. 11 is a simplified block diagram of system 1100 for automated data ingestion with replication, according to some example embodiments. The system 1100 may include storage 1102, which may be provided as cloud storage (e.g., Amazon S3 storage, Azure storage, GCP storage, etc.). The storage 1102 may include client data to upload to the data warehouse. The storage 1102 may be similar to the storage 402 described above with reference to FIG. 4.

The system 1100 may also include an event block 1104, a plurality of queues 1106.1, 1106.2, a primary deployment 1108, and a secondary deployment 1110. The components may function as described above, for example with reference to FIG. 6.

In addition, the system 1100 may include a secondary storage 1112 with its event block 1114. The secondary storage 1112 may also include client data to upload to the data warehouse as stored in storage 1102. The secondary storage 1112 may function as a back-up storage for storage 1102 in case of a system error therein. Thus, client data transfer can be seamlessly continued in case of a failover at the storage side. In this example, storage 1102 and secondary storage 1112 are provided in different geographic locations (US-east vs. US-west). In some embodiments, storage 1102 and secondary storage 1112 may be provided using different cloud services (e.g., Amazon S3 storage vs. Azure storage).

In some embodiments, when the secondary storage 1112 is switched to a primary storage designation, the deployment for the auto-ingestion may also be switched to the secondary deployment 1110. This may be done to match geographic locations of the storage and deployment being used when the secondary deployment is located in the same or near the geographical location of the secondary storage.

Figure 12:
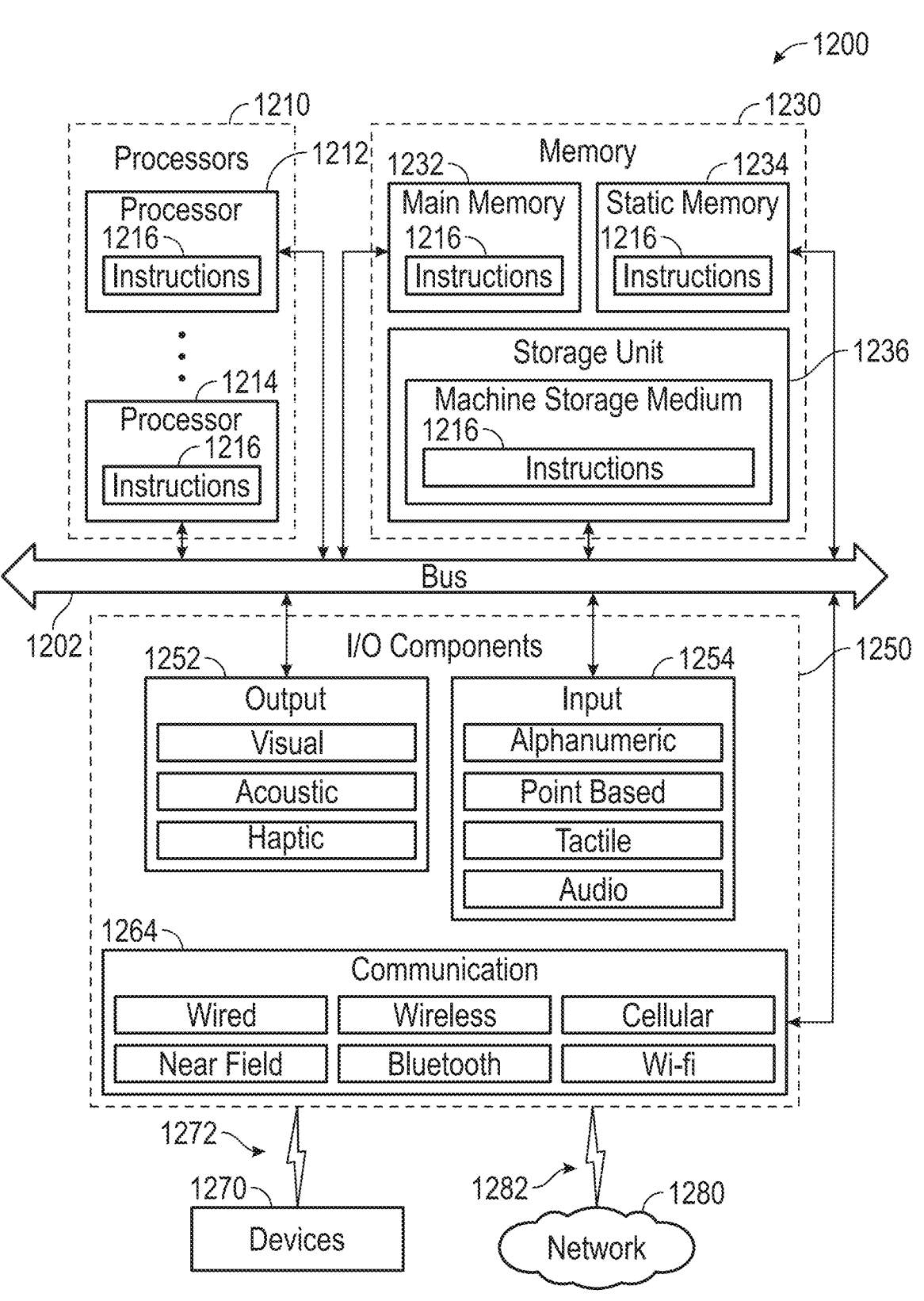
FIG. 12 illustrates a diagrammatic representation of a machine in the form of a computer system within which a set of instructions may be executed for causing the machine to perform any one or more of the methodologies discussed herein, in accordance with some embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one or more operations of any one or more of the methods described herein. As another example, the instructions 1216 may cause the machine 1200 to implement portions of the data flows described herein. In this way, the instructions 1216 transform a general, non-programmed machine into a particular machine 1200 (e.g., the remote computing device 106, the access management system 118, the compute service manager 112, the execution platform 114, the access management system 110, the Web proxy 120) that is specially configured to carry out any one of the described and illustrated functions in the manner described herein.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 includes processors 1210, memory 1230, and input/output (I/O) components 1250 configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)). For example, as noted above, the machine 1200 may correspond to any one of the remote computing device 106, the access management system 118, the compute service manager 112, the execution platform 114, the access management system 110, the Web proxy 120, and the devices 1270 may include any other of these systems and devices.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving, at a primary deployment and a secondary deployment, a data transfer request from a storage, the data transfer request including a plurality of files to be transferred; at the primary deployment, processing the data transfer request including transferring a first file of the plurality of files in the data transfer request and generating an expression property (EP) file indicating transfer of the first file; transmitting the EP file from the primary deployment to the secondary deployment; during the processing of the data transfer request, detecting a failover event; and based on detecting the failover event, at the secondary deployment: comparing information in the data transfer request to information in the EP file, and processing the data transfer request based on the comparing including transferring a second file of the plurality of files in the data transfer request.

Example 2. The method of example 2, wherein the data transfer request comprises an auto-ingest request.

Example 3. The method of any of examples 1-2, wherein the primary and secondary deployments each include pre-configured pipes to perform auto-ingestion of files from the storage.

Example 4. The method of any of examples 1-3, wherein the primary and secondary deployments each have respective queues associated with the storage.

Example 5. The method of any of examples 1-4, further comprising: at the secondary deployment, writing information from the EP file to a metadata database as a data persistent object (DPO), wherein the comparing is performed using the DPO and the data transfer request.

Example 6. The method of any of examples 1-5, wherein the EP file is transmitted from the primary deployment to the secondary deployment in response to a refresh command.

Example 7. The method of any of examples 1-6, wherein the data transfer request comprises a copy command.

Example 8. The method of any of examples 1-7, further comprising: at the secondary deployment, applying a bloom filter to the EP file.

Example 9. A system comprising: one or more processors of a machine; and a memory storing instructions that, when executed by the one or more processors, cause the machine to perform operations implementing any one of example methods 1 to 8.

Example 10. A machine-readable storage device embodying instructions that, when executed by a machine, cause the machine to perform operations implementing any one of example methods 1 to 8.

What is claimed is:

1. A method comprising:
   receiving, at a primary deployment of a network-based data system, a data transfer request associated with a first storage location, the data transfer request including a plurality of files to be transferred, the plurality of files being stored in the first storage location and a second storage location, the first storage location and the second storage location being outside of the network-based data system;
   processing, at the primary deployment, the data transfer request including transferring a first file of the plurality of files in the data transfer request and generating an expression property (EP) file indicating transfer of the first file;
   saving the EP file to a metadata database of the network-based data system;
   during the processing of the data transfer request, detecting a failover event at the first storage location; and
   based on detecting the failover event, switching the data transfer from the first storage location so that the data transfer is from a second storage location to the network-based data system, the switching comprising:
   comparing information in the data transfer request to information in EP file stored in the metadata database of network-based data system; and
   processing the data transfer request from the second storage location to the network-based data system based on the comparing comprising transferring a second file of the plurality of files in the data transfer request from the second storage location.

2. The method of claim 1, wherein the data transfer request includes an auto-ingest request.

3. The method of claim 2, wherein the primary deployment includes pre-configured pipes to perform auto-ingestion of files from the first storage location.

4. The method of claim 1, wherein processing the data transfer request from the second storage location to the network-based data system is performed by a secondary deployment of the network-based data system.

5. The method of claim 4, further comprising:
   at the secondary deployment, writing information from the EP file to the metadata database as a data persistent object (DPO), wherein the comparing is performed using the DPO and the data transfer request.

6. The method of claim 4, wherein the second deployment is located closer to the second storage location than the first deployment.

7. The method of claim 1, wherein the data transfer request includes a copy command.

8. A machine-storage medium embodying instructions that, when executed by a machine, cause the machine to perform operations comprising:

receiving, at a primary deployment of a network-based data system, a data transfer request associated with a first storage location, the data transfer request including a plurality of files to be transferred, the plurality of files being stored in the first storage location and a second storage location, the first storage location and the second storage location being outside of the network-based data system;

processing, at the primary deployment, the data transfer request including transferring a first file of the plurality of files in the data transfer request and generating an expression property (EP) file indicating transfer of the first file;

saving the EP file to a metadata database of the network-based data system;

during the processing of the data transfer request, detecting a failover event at the first storage location; and based on detecting the failover event, switching the data transfer from the first storage location so that the data transfer is from a second storage location to the network-based data system, the switching comprising:

comparing information in the data transfer request to information in EP file stored in the metadata database of network-based data system; and processing the data transfer request from the second storage location to the network-based data system based on the comparing comprising transferring a second file of the plurality of files in the data transfer request from the second storage location.

9. The machine-storage medium of claim 8, wherein the data transfer request includes an auto-ingest request.

10. The machine-storage medium of claim 9, wherein the primary deployment includes pre-configured pipes to perform auto-ingestion of files from the first storage location.

11. The machine-storage medium of claim 8, wherein processing the data transfer request from the second storage location to the network-based data system is performed by a secondary deployment of the network-based data system.

12. The machine-storage medium of claim 11, further comprising:

at the secondary deployment, writing information from the EP file to the metadata database as a data persistent object (DPO), wherein the comparing is performed using the DPO and the data transfer request.

13. The machine-storage medium of claim 11, wherein second deployment is located closer to the second storage location than the first deployment.

14. The machine-storage medium of claim 8, wherein the data transfer request includes a copy command.

15. A system comprising:

at least one hardware processor; and at least one memory storing instructions that, when executed by the at least one hardware processor, cause the at least one hardware processor to perform operations comprising:

receiving, at a primary deployment of a network-based data system, a data transfer request associated with a first storage location, the data transfer request including a plurality of files to be transferred, the plurality of files being stored in the first storage location and a second storage location, the first storage location and the second storage location being outside of the network-based data system;

processing, at the primary deployment, the data transfer request including transferring a first file of the plurality of files in the data transfer request and generating an expression property (EP) file indicating transfer of the first file;

saving the EP file to a metadata database of the network-based data system;

during the processing of the data transfer request, detecting a failover event at the first storage location; and based on detecting the failover event, switching the data transfer from the first storage location so that the data transfer is from a second storage location to the network-based data system, the switching comprising:

comparing information in the data transfer request to information in EP file stored in the metadata database of network-based data system; and processing the data transfer request from the second storage location to the network-based data system based on the comparing comprising transferring a second file of the plurality of files in the data transfer request from the second storage location.

16. The system of claim 15, wherein the data transfer request includes an auto-ingest request.

17. The system of claim 16, wherein the primary deployment includes pre-configured pipes to perform auto-ingestion of files from the first storage location.

18. The system of claim 15, wherein processing the data transfer request from the second storage location to the network-based data system is performed by a secondary deployment of the network-based data system.

19. The system of claim 18, the operations further comprising:

at the secondary deployment, writing information from the EP file to the metadata database as a data persistent object (DPO), wherein the comparing is performed using the DPO and the data transfer request.

20. The system of claim 18, wherein the second deployment is located closer to the second storage location than the first deployment.

21. The system of claim 15, wherein the data transfer request includes a copy command.

* * * * *